(12) United States Patent
Lemire et al.

(10) Patent No.: US 8,949,378 B2
(45) Date of Patent: Feb. 3, 2015

(54) METHOD AND SYSTEM FOR PROVIDING A STATE MODEL OF AN APPLICATION PROGRAM

(75) Inventors: Pierre Joseph Lemire, Calgary (CA); Monroe Milas Thomas, Calgary (CA); Matthew James Stephure, Calgary (CA); David Bruce McFadzean, Canmore (CA); Kevin Glen Robinson, Calgary (CA); Glen Lehmann, Crossfield (CA)

(73) Assignee: Calgary Scientific Inc. (CA)

( * ) Notice: Subject to any disclaimer, the term of this patent is extended or adjusted under 35 U.S.C. 154(b) by 66 days.

(21) Appl. No.: 13/425,496

(22) Filed: Mar. 21, 2012

(65) Prior Publication Data
US 2012/0246225 A1 Sep. 27, 2012

Related U.S. Application Data (60) Provisional application No. 61/487,598, filed on May 18, 2011.

(30) Foreign Application Priority Data

Mar. 21, 2011 (CA) ...................................... 2734860

(51) Int. Cl.
G06F 15/16 (2006.01)
G06F 9/44 (2006.01)
(Continued)

(52) U.S. Cl.
CPC ................ *G06F 8/70* (2013.01); *H04L 67/025* (2013.01); *G06F 9/541* (2013.01)
USPC ........................................................ 709/219

(58) Field of Classification Search
CPC ...................................................... H04L 67/025
USPC ......................................... 709/208, 219, 230
See application file for complete search history.

(56) References Cited

U.S. PATENT DOCUMENTS 5,345,550 A 9/1994 Bloomfield
5,555,003 A 9/1996 Montgomery et al.
(Continued)

FOREIGN PATENT DOCUMENTS

EP 0349463 1/1990
JP 2002/055870 2/2002
(Continued)

OTHER PUBLICATIONS

Extended European Search Report, dated Jun. 2, 2014, received in connection with European Application No. 12760310.8.
(Continued)

*Primary Examiner* — Lance L Barry
(74) *Attorney, Agent, or Firm* — Meunier Carlin & Curfman, LLC (57) ABSTRACT

Methods and apparatuses for enabling remote access to an application program via a computer network provided. Logical elements of the application program may be determined, from which a state model of the application program may be developed. A remote access program updates the state model in accordance with user input data received from a user interface program, generates control data in accordance with the updated state model and provides the same to the application program. The state model may be updated in accordance with application data received from the application program, application representation data in accordance with the updated state model are generated and provided to the user interface program for display at, e.g., a remote client computing device. The application program may be a legacy mainframe application to which remote access is provided without the need to modify the source code of the mainframe application.

18 Claims, 5 Drawing Sheets

(51) Int. Cl.
*H04L 29/08* (2006.01)
*G06F 9/54* (2006.01)

(56) References Cited

U.S. PATENT DOCUMENTS

| | | | |
|---|---|---|---|
| 5,742,778 A | 4/1998 | Hao et al. | |
| 5,870,759 A | 2/1999 | Bauer et al. | |
| 5,978,842 A | 11/1999 | Noble et al. | |
| 6,045,048 A | 4/2000 | Wilz et al. | |
| 6,061,689 A * | 5/2000 | Chang et al. | 717/116 |
| 6,075,531 A | 6/2000 | DeStefano | |
| 6,141,698 A | 10/2000 | Krishnan et al. | |
| 6,453,334 B1 | 9/2002 | Vinson et al. | |
| 6,601,233 B1 | 7/2003 | Underwood | |
| 6,792,607 B1 * | 9/2004 | Burd et al. | 719/316 |
| 6,918,113 B2 | 7/2005 | Patel et al. | |
| 7,065,568 B2 * | 6/2006 | Bracewell et al. | 709/223 |
| 7,069,227 B1 | 6/2006 | Lintel, III et al. | |
| 7,073,059 B2 * | 7/2006 | Worely et al. | 713/168 |
| 7,149,761 B2 | 12/2006 | Cooke et al. | |
| 7,167,893 B1 * | 1/2007 | Malone et al. | 709/201 |
| 7,174,504 B2 | 2/2007 | Tsao | |
| 7,181,686 B1 | 2/2007 | Bahrs | |
| 7,240,162 B2 | 7/2007 | de Vries | |
| 7,246,063 B2 * | 7/2007 | James et al. | 704/270.1 |
| 7,343,310 B1 * | 3/2008 | Stender | 705/4 |
| 7,451,196 B1 | 11/2008 | de Vries et al. | |
| 7,577,751 B2 | 8/2009 | Vinson et al. | |
| 7,620,901 B2 | 11/2009 | Carpenter et al. | |
| 7,647,370 B1 | 1/2010 | Liu et al. | |
| 7,650,444 B2 * | 1/2010 | Dirstine et al. | 710/72 |
| 7,656,799 B2 | 2/2010 | Samuels et al. | |
| 7,725,331 B2 | 5/2010 | Schurenberg et al. | |
| 7,802,183 B1 | 9/2010 | Essin | |
| 7,831,919 B1 * | 11/2010 | Viljoen et al. | 715/762 |
| 7,921,078 B2 | 4/2011 | McCuller | |
| 7,941,488 B2 | 5/2011 | Goodman et al. | |
| 7,966,572 B2 | 6/2011 | Matthews et al. | |
| 8,024,523 B2 | 9/2011 | de Vries et al. | |
| 8,261,345 B2 | 9/2012 | Hitomi et al. | |
| 8,356,252 B2 * | 1/2013 | Raman et al. | 715/762 |
| 8,359,591 B2 | 1/2013 | de Vries et al. | |
| 8,509,230 B2 | 8/2013 | Vinson et al. | |
| 8,527,706 B2 | 9/2013 | de Vries et al. | |
| 8,572,178 B1 | 10/2013 | Frazzini et al. | |
| 2001/0047393 A1 * | 11/2001 | Arner et al. | 709/216 |
| 2003/0014735 A1 | 1/2003 | Achlioptas et al. | |
| 2003/0023670 A1 | 1/2003 | Walrath | |
| 2003/0065738 A1 * | 4/2003 | Yang et al. | 709/215 |
| 2003/0120324 A1 * | 6/2003 | Osborn et al. | 607/60 |
| 2003/0149941 A1 | 8/2003 | Tsao | |
| 2003/0184584 A1 | 10/2003 | Vachuska et al. | |
| 2003/0208472 A1 | 11/2003 | Pham | |
| 2004/0068516 A1 | 4/2004 | Lee et al. | |
| 2004/0106916 A1 | 6/2004 | Quaid et al. | |
| 2004/0243919 A1 | 12/2004 | Muresan et al. | |
| 2004/0249885 A1 | 12/2004 | Petropoulakis et al. | |
| 2005/0010871 A1 | 1/2005 | Ruthfield et al. | |
| 2005/0050229 A1 | 3/2005 | Comeau et al. | |
| 2005/0138631 A1 | 6/2005 | Bellotti et al. | |
| 2005/0188313 A1 | 8/2005 | Matthews et al. | |
| 2006/0026006 A1 | 2/2006 | Hindle | |
| 2006/0101397 A1 | 5/2006 | Mercer et al. | |
| 2006/0231175 A1 | 10/2006 | Vondracek et al. | |
| 2006/0236328 A1 | 10/2006 | DeWitt | |
| 2006/0294418 A1 | 12/2006 | Fuchs | |
| 2007/0024645 A1 | 2/2007 | Purcell et al. | |
| 2007/0112880 A1 | 5/2007 | Yang et al. | |
| 2007/0226636 A1 | 9/2007 | Carpenter et al. | |
| 2007/0282951 A1 | 12/2007 | Selimis et al. | |
| 2008/0146194 A1 | 6/2008 | Yang et al. | |
| 2008/0183190 A1 | 7/2008 | Adcox et al. | |
| 2008/0313282 A1 | 12/2008 | Warila et al. | |
| 2009/0044171 A1 * | 2/2009 | Avadhanula | 717/105 |
| 2009/0080523 A1 * | 3/2009 | McDowell | 375/240.15 |
| 2009/0089742 A1 | 4/2009 | Nagulu et al. | |
| 2009/0119644 A1 | 5/2009 | de Vries et al. | |
| 2010/0131591 A1 * | 5/2010 | Thomas et al. | 709/203 |
| 2010/0174773 A1 | 7/2010 | Penner et al. | |
| 2010/0205147 A1 | 8/2010 | Lee | |
| 2012/0133675 A1 * | 5/2012 | McDowell | 345/629 |
| 2012/0154633 A1 | 6/2012 | Rodriguez | |
| 2012/0221792 A1 | 8/2012 | de Vries et al. | |
| 2012/0245918 A1 | 9/2012 | Overton et al. | |
| 2012/0246225 A1 * | 9/2012 | Lemire et al. | 709/203 |
| 2013/0007227 A1 | 1/2013 | Hitomi et al. | |
| 2013/0179962 A1 | 7/2013 | Arai et al. | |

FOREIGN PATENT DOCUMENTS

| | | |
|---|---|---|
| JP | 2005/031807 | 2/2005 |
| JP | 2005/521946 | 7/2005 |
| RU | 2295752 | 3/2007 |
| RU | 2298287 | 4/2007 |
| WO | 98/058478 | 12/1998 |
| WO | 01/16724 | 3/2001 |
| WO | 02/009106 | 1/2002 |
| WO | 03/032569 | 4/2003 |
| WO | 03/083684 | 10/2003 |
| WO | 2010/060206 | 6/2010 |
| WO | 2010/088768 | 8/2010 |
| WO | 2010/127327 | 11/2010 |
| WO | 2013/024342 | 2/2013 |
| WO | 2013/024343 | 2/2013 |
| WO | 2013/109984 | 7/2013 |
| WO | 2013/128284 | 9/2013 |
| WO | 2013/153439 | 10/2013 |

OTHER PUBLICATIONS

Coffman, Daniel, et al. "A Client-Server Architecture for State-Dependent Dynamic Visualizations on the Web," IBM T.J. Watson Research Center, 2010, 10 pages.

Fraser, N., "Differential Synchronization," Google, Mountain View, CA, Jan. 2009, 8 pages.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Microsoft Computer Dictionary, Microsoft Press, 5th Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

Remote Desktop Services (RDS), Remote App, retrieved on May 4, 2014 from http://en.wikipedia.org/wiki/Remote_Desktop_Services, 9 pages.

Remote Desktop Services (RDS), Windows Desktop Sharing, retrieved on May 4, 2014 from http://en.wikipedia.org/wiki/Remote_Desktop_Services, 9 pages.

International Search Report, dated Feb. 19, 2010, in connection with International Application No. PCT/CA2009/001704.

International Preliminary Report on Patentability and Written Opinion, dated May 31, 2011, in connection with International Application No. PCT/CA2009/001704.

International Search Report, dated May 12, 2010, in connection with International Application No. PCT/CA2010/000154.

International Preliminary Report on Patentability and Written Opinion, dated Aug. 9, 2011, in connection with International Application No. PCT/CA2010/000154.

International Search Report and Written Opinion, dated Jul. 31, 2012, in connection with International Application No. PCT/IB2012/000562.

International Search Report, dated Dec. 20, 2012, in connection with International Application No. PCT/IB2012/001589.

International Preliminary Report on Patentability and Written Opinion, dated Feb. 18, 2014, in connection with International Application No. PCT/IB2012/001589.

(56) References Cited

OTHER PUBLICATIONS

International Search Report, dated Dec. 28, 2012, in connection with International Application No. PCT/IB2012/001590.
International Preliminary Report on Patentability, and Written Opinion, dated Feb. 18, 2014, in connection with International Application No. PCT/IB2012/001590.
International Search Report and Written Opinion, dated Aug. 21, 2013, in connection with International Application No. PCT/IB2013/000676.
International Search Report and Written Opinion, dated Jul. 31, 2013, in connection with International Application No. PCT/IB2013/000720.

* cited by examiner

```xml
<ApplicationState>
<Screens>
   <Screen id="0" name="main menu">
     <Fields>
        <Field name="name" description="Customer name" default="">
         <Type fieldType="Text" maxChars="128" />
         <Validation />
         </Field>
     </Fields>
   </Screen>
   <Screen id="1" name="ticket customer entry" />
     <Screen id="2" name="ticket customer choice" />
     <Screen id="3" name="ticket customer payment" />
     <Screen id="4" name="ticket customer payment accepted" />
     <Screen id="5" name="ticket customer payment declined" />
</Screens>
 <NavModel>
     <Transition sourceId="0" destId="1" trigger="Key_1" />
     <Transition sourceId="1" destId="0" trigger="Key_ESC" />
     <Transition sourceId="3" destId="5" trigger="server" />
     <Transition sourceId="5" destId="3" trigger="Key_ESC" />
</NavModel>
 <ScreenData>
   <CurrentScreen id="0" />
     <Screen id="0">
   <Value field="name">John Miller</Value>
   </Screen>
 </ScreenData>
</ApplicationState>
```

METHOD AND SYSTEM FOR PROVIDING A STATE MODEL OF AN APPLICATION PROGRAM

CROSS-REFERENCE TO RELATED APPLICATION

The present application claims priority to U.S. Provisional Application No. 61/487,598, filed May 18, 2011, and entitled "Method and System for Providing a State Model of an Application Program," which is incorporated herein by reference in its entirety.

BACKGROUND OF THE DISCLOSURE

Ubiquitous remote access to services, application programs and data has become commonplace as a result of the growth and availability of broadband and wireless network access. Remote access to application programs may be provided using a mobile device connected to a server computer via a computer network. Use of wireless handheld devices such as, for example, IPHONE, ANDROID, and IPAD has rapidly increased over the last couple of years to the extent that now many own at least one wireless handheld device. State of the art wireless mobile technology enables use of small wireless handheld devices to access the Internet and interact with various types of application programs.

Most computer applications used in, for example, large businesses, government organizations, and hospitals are still legacy mainframe computer applications run on a mainframe computer network. The original terminals have been replaced by Personal Computers (PCs) and terminal emulators enabling the PC user to interact with the mainframe computer application. However, to provide mobile devices with remote access to such programs, it is generally required that the source code of the mainframe computer application and/or the terminal emulator is modified in order to create an appropriate interface for the mobile device to interact with the legacy application. This can be expensive, time consuming and difficult to accomplish.

SUMMARY OF THE DISCLOSURE

According to an aspect of the present disclosure, there is provided a method for providing remote access to an application program over a communication network. The method may include determining logical elements of the application program; determining a state model in accordance with the logical elements of the application program, the state model providing an association of logical elements of the application program with corresponding states of the application program; generating a remote access program or application in accordance with the state model, the remote access program or application updating the state model in accordance with data received from a user interface program or client remote access application and updating the state model in accordance with application data received from the application program; and generating the user interface program or client remote access application to enable remote interaction with the application program.

According to another aspect of the present disclosure, there is provided an apparatus for providing remote access to a mainframe application. The apparatus may include a network interface, a memory that stores computer executable instructions, and a processor that executes the computer executable instructions. The executable instructions may determine logical elements of the application program; determine a state model in accordance with the logical elements of the application program, the state model providing an association of logical elements of the application program with corresponding states of the application program; generate a remote access program or application in accordance with the state model, the remote access program or application updating the state model in accordance with data received from a user interface program or client remote access application and updating the state model in accordance with application data received from the application program; and generate the user interface program or client remote access application to enable remote interaction with the mainframe application.

According to another aspect of the present disclosure, there is provided a method for providing remote access to an application program via a computer network. Logical elements of the application program may be determined. A state model of the application program may then be determined in accordance with the logical elements. In accordance with the state model, a remote access program or application may be generated. The remote access program or application updates the state model in accordance with user input data received from a user interface program or client remote access application, generates control data in accordance with the updated state model and provides the same to the application program. Further, the state model is updated in accordance with application data received from the application program, application representation data in accordance with the updated state model are generated and provided to the user interface program or client remote access application.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DESCRIPTION OF THE IMPLEMENTATIONS

Unless defined otherwise, all technical and scientific terms used herein have the same meaning as commonly understood by one of ordinary skill in the art to which the disclosure belongs. As will become evident to those of ordinary skill in the art, methods and materials similar or equivalent to those described herein can be used in the practice or testing of the present disclosure. As will be appreciated from the present disclosure, implementations will be described for enabling remote access to a mainframe application computer program via a computer network absent source code modification of the mainframe computer application and/or the terminal emulator.

Figure 1:
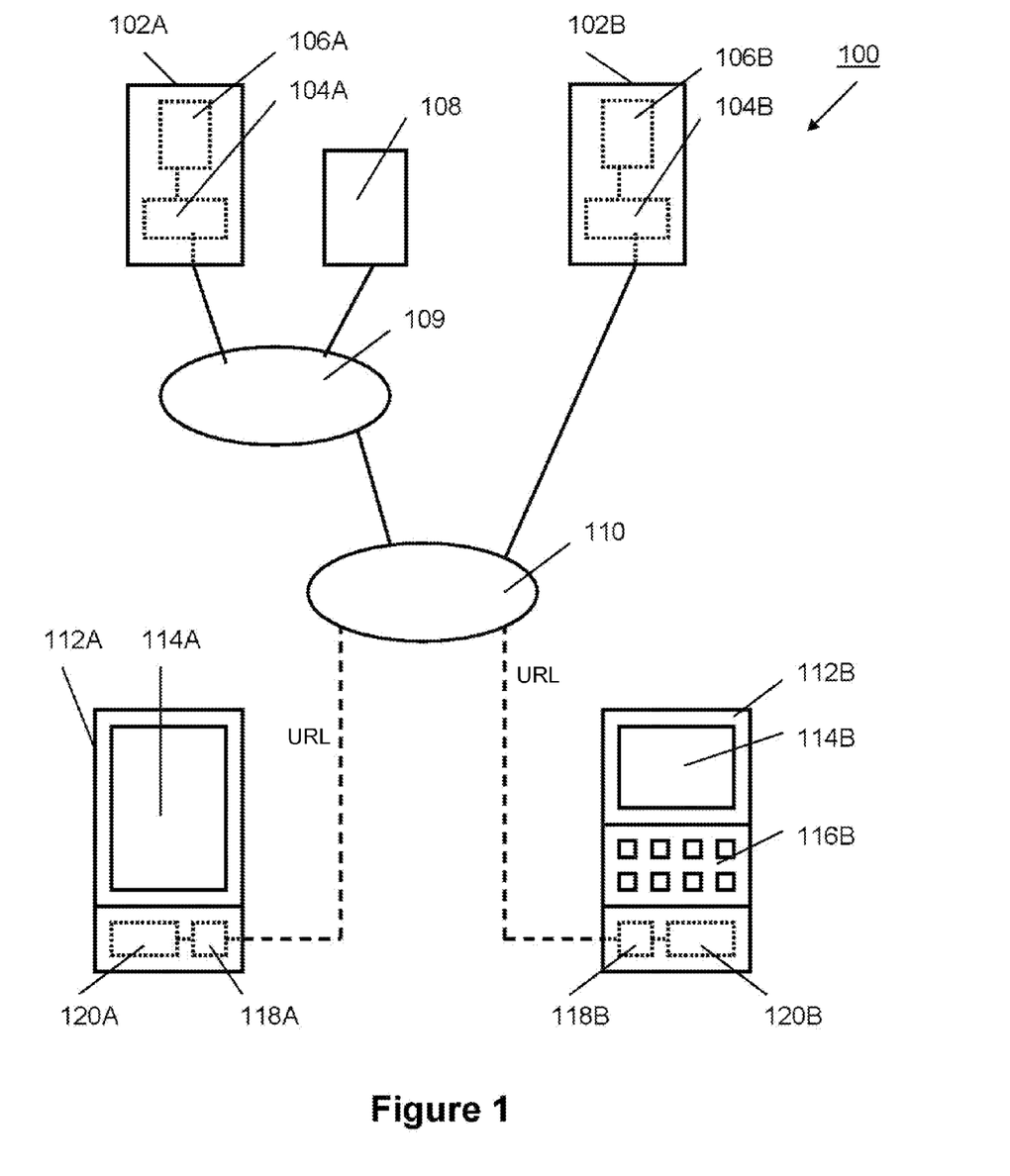
FIG. 1 is a simplified block diagram illustrating a system for providing remote access to an application program from a client computer via a computer network according to an implementation of the disclosure.

Referring to FIG. 1, there is illustrated a system 100 for providing remote access to an application program via a computer network according to an implementation of the disclosure. The system comprises a client computer 112A or 112B, e.g., a wireless handheld device such as, for example, an IPHONE 112A or a BLACKBERRY 112B connected via a computer network 110 such as, for example, the Internet, to server computer 102B. The client computer may be a mobile device (e.g., a smartphone, a tablet device, a notebook/laptop computer), a desktop computer (e.g., a personal computer executing MICROSOFT WINDOWS, MAC OS, Linux) or workstation.

The server computer 102B may be connected, for example, via the computer network 110 to a Local Area Network (LAN) 109. For example, the LAN 109 may be an internal computer network of an institution such as a hospital, a bank, a large business, or a government department. Typically, such institutions still use a mainframe computer 102A and a database 108 connected to the LAN 109, as these legacy systems provide numerous services to the institution. Numerous application programs are performed, for example, by executing on processor 104A executable commands of the respective application program stored in memory 106A of the mainframe computer 102A. The original terminals connected to the mainframe computer 102A via the LAN 109 and used to interact with the mainframe computer 102A have been replaced with Personal Computers (PCs). Remote access to the application program executed on the mainframe computer 102A is then provided using terminal emulator programs, typically executed on the PCs.

Figure 2A:
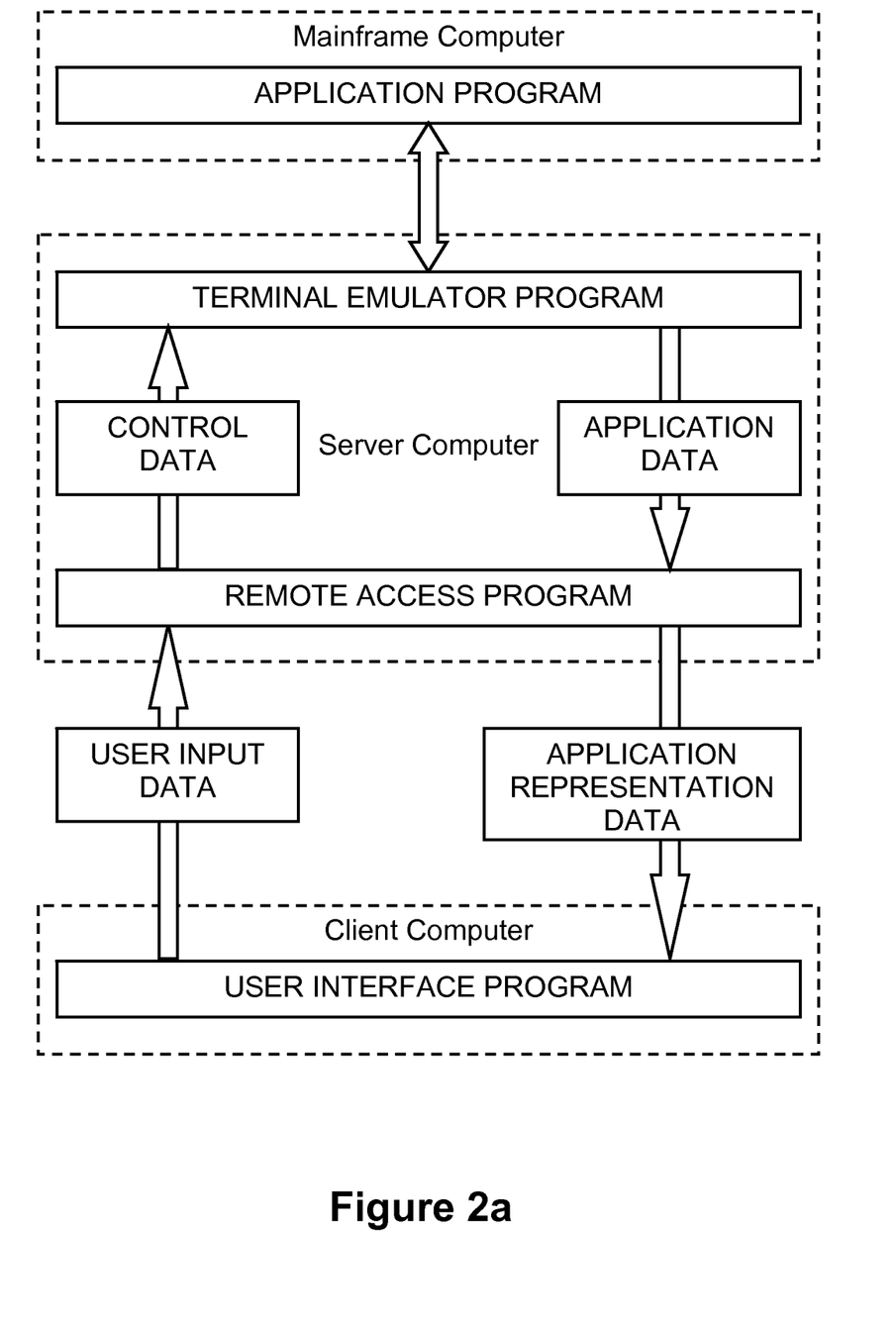
FIG. 2a is a simplified block diagram illustrating communication of the client computer with an application program using the system shown in FIG. 1.

According to some implementations, remote access to the application program using, for example, a handheld wireless device 112A, 112B is provided by executing a remote access program or application on processor 104B of the server computer 102B which is in communication with a respective terminal emulator program executed using, for example, the processor 104B of the server computer 102B. Communication between the client computer 112A or 112B and the server computer 102B may be provided as communication between the remote access program or application and a user interface program or client remote access application via, for example, a wireless computer network, as illustrated in FIG. 2a. The user interface program or client remote access application may be designed for providing user interaction via a handheld wireless device for displaying data in a human comprehensible fashion and for determining user input data in accordance with received user instructions for interacting with the application program using, for example, a graphical display with touch-screen 114A or a graphical display 114B and a keyboard 116B of the handheld wireless device 112A, 112B, respectively.

The user interface program or client remote access application may be performed by executing executable commands on processor 118A, 118B of the client computer 112A, 112B with the commands being stored in memory 120A, 120B of the client computer 112A, 112B, respectively. For example, the user interface program or client remote access application is performed by executing executable commands on processor 118A, 118B of the client computer 112A, 112B with the commands being stored in memory 120A, 120B of the client computer 112A, 112B, respectively. Alternatively, the user interface program or client remote access application is executed on the server computer 102B which is then accessed via an URL by a generic client application such as, for example, a web browser executed on the client computer 112A, 112B. The user interface is implemented using, for example, Hyper Text Markup Language HTML 5.

The remote access program or application may determine control data in accordance with the user input data received from the user interface program or client remote access application and provides the same to the terminal emulator program. The terminal emulator program is in communication with the application program executed on the mainframe computer 102A. Data generated by the application program are then provided via the terminal emulator program as application data to the remote access program or application, which generates application representation data in dependence thereupon and provides the same to the user interface program or client remote access application for display. For example, the remote access program or application and the terminal emulator program are executed using the processor 104B of the server computer 102B connected to the LAN 109 via computer network 110, as illustrated in FIGS. 1 and 2a. Alternatively, the remote access program or application and the terminal emulator program are executed using the processor 104a of the mainframe computer 102A or a processor of a computer in communication with the mainframe computer 102A via the LAN 109. Further alternatively, the remote access program or application is executed using the processor 118A, 118B of the client computer 112A, 112B, respectively.

Figure 2B:
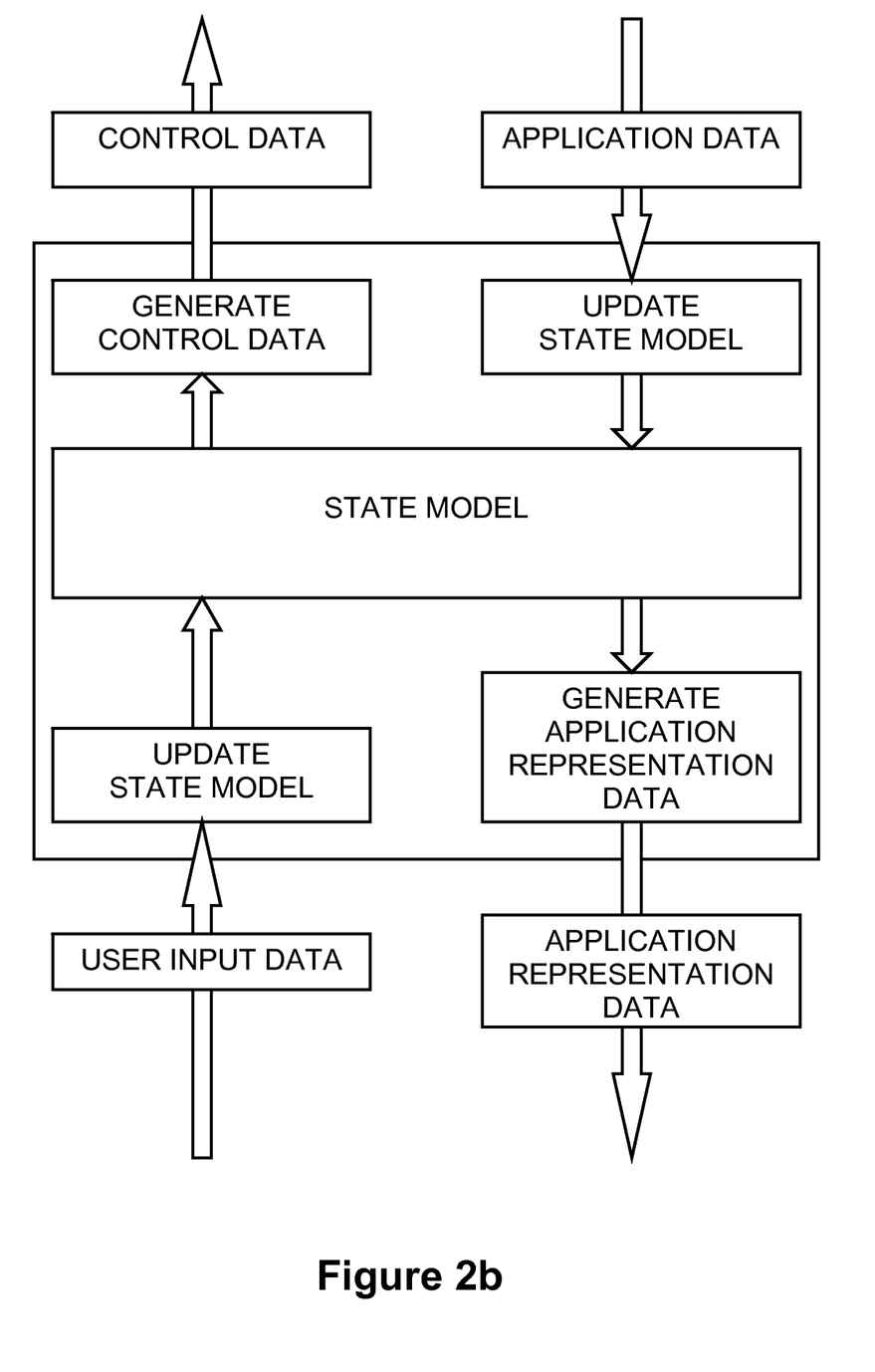
FIG. 2b is a simplified block diagram illustrating operation of the remote access program or application according to an implementation of the disclosure.

The operation of the remote access program or application may be performed in accordance with a state model of the application program, as illustrated in FIG. 2b. When executed, the remote access program or application updates the state model in accordance with user input data received from a user interface program or client remote access application, generates control data in accordance with the updated state model, and provides the same to the application program via the terminal emulator program. Upon receipt of application data from the terminal emulator program, the remote access program or application updates the state model in accordance with the application data received from the application program, generates application representation data in accordance with the updated state model, and provides the same to the user interface program or client remote access application. The state model comprises an association of logical elements of the application program with corresponding states of the application program, where the logical elements may be in a hierarchical order. The state model may be determined such that each of the logical elements is associated with a corresponding state of the application program. Further, the state model is determined such that the logical elements are associated with user interactions. For example, the logical elements of the application program are determined such that the logical elements comprise transition elements with each transition element relating a change of the state model to one of control data and application representation data associated therewith.

Figure 2C:
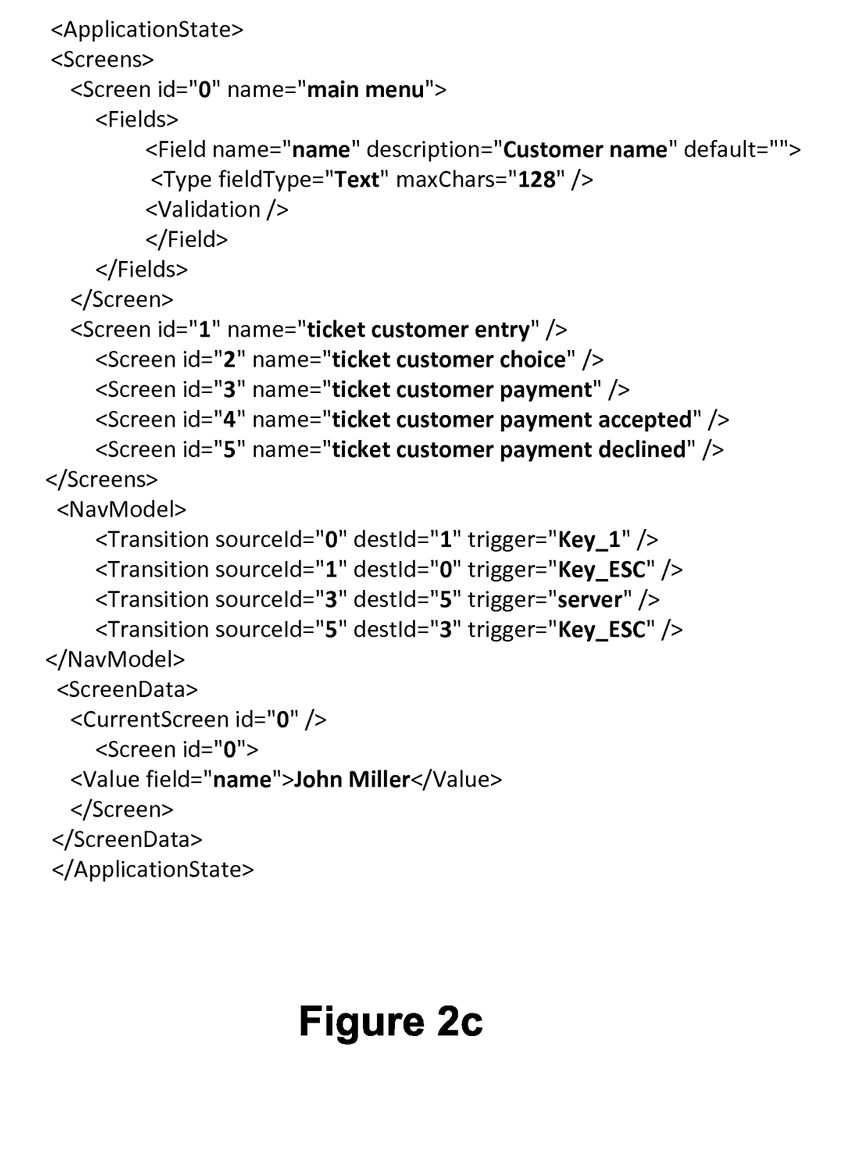
FIG. 2c is an example section of a state model according to an implementation of the disclosure.

FIG. 2c illustrates an example section of a state model of an application program for purchasing a ticket. The state model may be represented in an Extensible Markup Language (XML) document. Other representations of the state model are contemplated, such as, but not limited to, a binary file, a data structure, etc. Different states of the application program associated with different screens related to different stages of the ticket purchasing process, such as, for example, main menu, ticket customer entry, etc., are defined, as well as transitions between the different states and the related triggers. For example, for each state one or more "fields" are defined for receiving user input data and displaying the same, as illustrated in FIG. 2c for the main menu.

Figure 3:
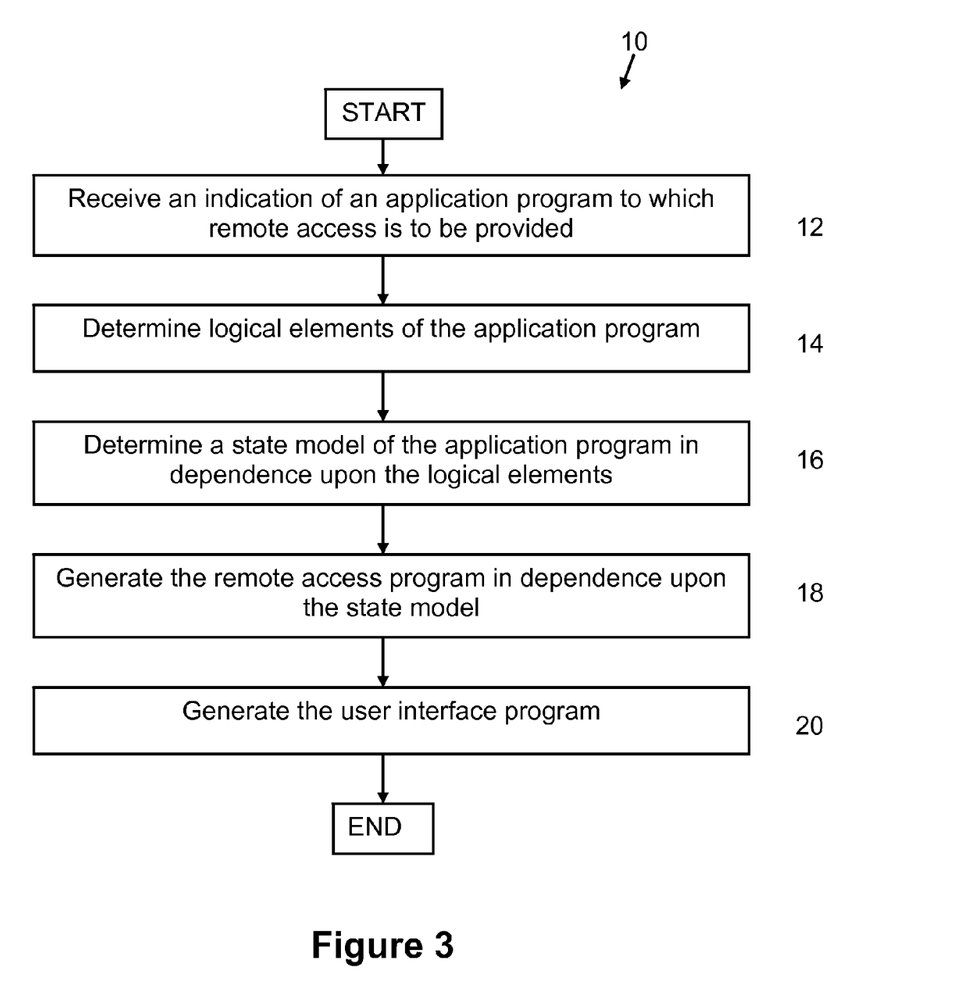
FIG. 3 is a simplified flow diagram illustrating generation of the remote access program or application according to an implementation of the disclosure.

Referring to FIG. 3, there is illustrated a flow diagram 10 of an example method for generating a remote access program or application according to an implementation of the disclosure. At 12, an indication is received of application program to which remote access is to be provided by a development program. For example, a file browser of a "Choose Application" tool of the development program may be provided to a user. The development program may be software development kit, such as that included with PUREWEB, available from Calgary Scientific, Inc., Calgary, Alberta, Canada. At 14, the logical elements of the application program are then determined for example, by launching the application program. Alternatively, the logical elements are provided from a database. At 16, a state model of the application program is the determined in accordance with the logical element, for example, by creating a hierarchical representation of the user interface elements, assigning each a unique ID, and labeling each element.

At 18, the development program then generates the remote access program or application in accordance with the state model, for example, in the form of executable XML commands. At 20, the user interface program or client remote access application is generated to interact with the remote access program or application. The user interface program or client remote access application is generated using standard application tools such as, for example, Microsoft Silverlight. The development program is performed for example, by executing executable commands stored in a storage medium on a processor using, for example, the processor 104B of the server computer 102B. Alternatively, the development is performed using a computer in communication with the server computer 102B via the computer network 110.

In accordance with some implementations, the development program, the remote access program or application and the user interface program or client remote access application are implemented using standard programming tools such as, for example, Extensible Markup Language (XML), Microsoft Foundation Class (MFC) applications, Remote Desktop Protocol (RDP), Adobe Flash and Microsoft Silverlight. In accordance with some implementations, communication is enabled using standard communication technologies such as, for example, Hyper Text Transfer Protocol (HTTP), virtual private networks (VPN), and secure socket layers (SSL) which are well known to those skilled in the art. Optionally, the terminal emulator program may be omitted if communication with the application program is enabled using, for example, RDP or MFC applications.

The present disclosure has been described herein with regard to preferred implementations. However, it will be obvious to persons skilled in the art that a number of variations and modifications can be made without departing from the scope of the disclosure as described herein.

What is claimed is:

1. A server-based method for providing remote access to a mainframe application program executing on a mainframe computer over a communication network, comprising:
   determining logical elements of the application program;
   determining a state model in accordance with the logical elements of the application program, the state model providing an association of logical elements of the application program with corresponding states of the application program;
   generating a remote access program in accordance with the state model, the remote access program updating the state model in accordance with data received from a user interface program and updating the state model in accordance with application data received from the application program;
   providing application data generated by the mainframe application to a terminal emulator program executing on a server computer communicatively connected to the mainframe computer;
   providing application data from the terminal emulator program to the remote access program to update the state model and to generate application representation data and
   providing the application representation data to the user interface program; and
   generating the user interface program to enable remote interaction with the application program.

2. The method of claim 1, further comprising determining the logical elements by launching the application program.

3. The method of claim 1, further comprising determining the logical elements by accessing a database and retrieving the logical elements.

4. The method of claim 1, further comprising:
   representing the logical elements in a hierarchical representation of user interface elements;
   assigning each logical element a unique ID; and
   labeling each logical element.

5. The method of claim 1, further comprising representing the logical elements in an Extensible Markup Language (XML) document.

6. The method of claim 1, wherein the logical elements are associated with user interactions.

7. The method of claim 6, wherein the logical elements comprise transition elements, and wherein each transition element relates a change of the state model to one of control data and application representation data associated therewith.

8. The method of claim 1, further comprising making the user interface program accessible at a Uniform Resource Locator (URL).

9. The method of claim 1, further comprising:
   receiving an input at the user interface program;
   updating the state model at the remote access program in accordance with the input and generating control data;
   providing control data to the terminal emulator program; and
   providing the control data to the mainframe application.

10. An apparatus for providing remote access to a mainframe application over a communication network, comprising:
    a network interface device that interfaces with the communication network;
    a memory that stores computer executable instructions; and
    a processor that executes the computer executable instructions to:
    determine logical elements of the mainframe application;
    determine a state model in accordance with the logical elements of the mainframe application, the state model providing an association of logical elements of the mainframe application with corresponding states of the mainframe application;
    generate a remote access program in accordance with the state model, the remote access program updating the state model in accordance with data received from a user interface program and updating the state model in accordance with application data received from the mainframe application;

provide application data generated by the mainframe application to a terminal emulator program executing on a server computer communicatively connected to a mainframe computer;

provide application data from the terminal emulator program to the remote access program to update the state model and to generate application representation data;

provide the application representation data to the user interface program; and generate the user interface program to enable remote interaction with the mainframe application.

11. The apparatus of claim 10, wherein the processor further executes computer executable instructions to:

represent the logical elements in a hierarchical representation of user interface elements;

assign each logical element a unique ID; and label each logical element.

12. The apparatus of claim 10, wherein the processor further executes computer executable instructions to make the user interface program available at a Uniform Resource Locator (URL).

13. The apparatus of claim 10, wherein the processor further executes computer executable instructions to:

receive an input at the user interface program;

update the state model at the remote access program in accordance with the input and generating control data;

provide control data to the terminal emulator program; and provide the control data to the mainframe application.

14. A method for providing remote access to an application program via a computer network comprising:

determining logical elements of the application program, the application program being executed on a mainframe computer connected to the computer network;

determining a state model of the application program in accordance with the logical elements;

providing application data generated by the application program to a terminal emulator program executing on a server computer communicatively connected to the mainframe computer; and generating a remote access program at the server computer in accordance with the state model, the remote access program:

updating the state model in accordance with input data received from the terminal emulator program;

generating control data in accordance with the updated state model and providing the control data to the application program;

updating the state model in accordance with application data received from the application program;

generating application representation data in accordance with the updated state model; and providing the application representation data to the user interface program.

15. The method of claim 14, further comprising:

representing the logical elements in a hierarchical representation of user interface elements;

assigning each logical element a unique ID; and labeling each logical element.

16. The method of claim 14, further comprising representing the logical elements in an Extensible Markup Language (XML) document.

17. The method of claim 14, wherein the logical elements are associated with user interactions.

18. The method of claim 14, further comprising making the user interface program available at a Uniform Resource Locator (URL).

* * * * *